(12) United States Patent
Malmberg et al.

(10) Patent No.: US 7,150,490 B2
(45) Date of Patent: *Dec. 19, 2006

(54) TONNEAU COVER

(75) Inventors: Matthew Samuel Malmberg, Rockford, IL (US); Owen Bassett, Chicago, IL (US)

(73) Assignee: Lund International, Inc., Anoka, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/135,138

(22) Filed: May 23, 2005

(65) Prior Publication Data

US 2006/0255616 A1 Nov. 16, 2006

Related U.S. Application Data

(63) Continuation-in-part of application No. 11/127,380, filed on May 12, 2005.

(51) Int. Cl.
*B60P 7/04* (2006.01)
(52) U.S. Cl. .............................. 296/100.15; 296/100.16
(58) Field of Classification Search ........... 296/100.15, 296/100.16
See application file for complete search history.

(56) References Cited

U.S. PATENT DOCUMENTS

| 4,353,567 | A | 10/1982 | Weldy ......................... 280/92 |
|---|---|---|---|
| 4,750,776 | A | 6/1988 | Barben ..................... 296/39 R |
| 5,076,338 | A | 12/1991 | Schmeichel et al. ..... 160/368.1 |
| 5,174,353 | A | 12/1992 | Schmeichel et al. ..... 160/368.1 |
| 5,275,458 | A | 1/1994 | Barben et al. .............. 296/100 |
| 5,460,423 | A | 10/1995 | Kersting et al. ............ 296/100 |
| 5,540,475 | A | 7/1996 | Kersting et al. ............ 296/100 |
| 5,636,893 | A | 6/1997 | Wheatley et al. ........... 296/100 |
| 5,906,407 | A * | 5/1999 | Schmeichel ............. 296/100.15 |
| 5,975,828 | A | 11/1999 | Weldy ......................... 414/484 |
| 6,053,558 | A | 4/2000 | Weldy et al. .......... 296/100.17 |
| 6,099,047 | A | 8/2000 | Reiff et al. .................... 292/4 |
| 6,149,220 | A | 11/2000 | Weldy et al. .......... 296/100.06 |
| 6,257,306 | B1 | 7/2001 | Weldy ........................ 160/327 |
| 6,543,835 | B1 | 4/2003 | Schmeichel et al. ... 296/100.15 |
| 6,607,234 | B1 | 8/2003 | Schmeichel ............ 296/100.16 |
| 6,672,644 | B1 | 1/2004 | Schmeichel ............ 296/100.15 |
| 6,719,353 | B1 * | 4/2004 | Isler et al. ..................... 296/98 |

* cited by examiner

*Primary Examiner*—Dennis H. Pedder
(74) *Attorney, Agent, or Firm*—Thomas J. Nikolai; Nikolai & Mersereau P.A.

(57) ABSTRACT

A vehicle tonneau cover design that adjustably accommodates changes in the size of the tarp of the tonneau cover due to weather or the like and provides stable attachment of the tarp to the vehicle. The tonneau cover includes a tarp, a frame coupled to the vehicle, and a latch assembly made up of a latch bar attached to the free end of a cover and a pair of latch mechanisms used to lock the latch bar to the frame at an attachment point. The latch mechanisms are releasable and adjustable to change the longitudinal position of the attachment point relative to the frame.

3 Claims, 6 Drawing Sheets

TONNEAU COVER

BACKGROUND OF THE INVENTION

This application is a continuation-in-part of prior application Ser. No. 11/127,380 filed on May 12, 2005, with an entirety thereof being deemed incorporated herein by reference.

I. Field of the Invention

This invention relates generally to a cover assembly capable of enclosing the bed of a pickup truck, and more particularly to a cover assembly for securing the tarp of a tonneau cover to a frame over the truck's bed.

II. Discussion of the Prior Art

In the past, a number of protective coverings have been manufactured to protect materials placed in the bed of a pickup truck. Many of the coverings developed were fabric covers that were somewhat stretchable and attached to a rigid frame surrounding the interior of the truck's bed. Known methods for attaching the frame and cover included snaps, hooks, and other fasteners. Despite these advances, the attachment arrangements often are difficult to adjust as the cover stretches over time. Some even require the cover to be nearly completely removed to provide adjustment to accommodate stretching.

In response to the difficulty experienced in maintaining tension in these tonneau covers, devices began to be utilized having various configurations of assembly members for attaching the cover to the frame. One design used hook and loop type fasteners and stretcher bars to fasten a cover to a frame structure. The end plate pivotally contacted the end of the frame structure as the end plate was rotated into a fixed stretching position. Several similar variations of this design were made using a variety of attachment components. Although these designs were somewhat useful, they did not effectively solve many problems which still existed in these designs.

One problem that continues to exist with prior art tonneau covers is that the tarp material can expand and contract due to weather conditions or loading of the cover. Therefore, there is a real need to provide an arrangement that can be easily and quickly adjusted to securely hold the cover in place as the truck travels the roads and highways.

SUMMARY OF THE INVENTION

The present invention provides for a vehicle tonneau cover design that is adjustable to accommodate changes in the size of the tarp of the tonneau cover due to weather or the like and provides stable attachment of the tarp to the vehicle. In addition to the tarp, the tonneau cover includes a frame coupled to the vehicle and a latch assembly. A first end of the tarp is attached to the frame. A second end of the tarp is attached to a latch bar of the latch assembly.

The latch assembly also includes a pair of latch mechanisms. Each latch mechanism includes a block having first and second bores. The first bore is used to attach the block to the frame.

Each latch mechanism also includes a housing at least partially surrounding the block and slidable relative thereto. The housing includes a camming surface terminating in a lip. The housing also includes at least one bearing surface to which a pall is pivotally coupled for rotation between a latching position and a release position. The pall is biased toward its latching position. The pall, the camming surface and the lip cooperate to define an attachment point.

The housing also includes a hole aligned with the second threaded bore of the block. A first engagement surface surrounds this hole in the housing. A threaded bolt, having a second engagement surface (which may be part of the head of the bolt or a separate washer) is provided. This second engagement surface also provides a visual adjustment workstation as will be made more clear from the discussion provided below. This bolt passes through the hole in the housing and the second bore of the block. The bolt is then coupled to a threaded fastener such as a nut. Of course, other methods of joining the bolt to the housing could be used. A biasing member, for example a spring, is provided between the first and second engagement surfaces. A stop is also provided on the housing. As the latch bar is inserted into the attachment point and rotated into its latched position, the housing slides until the stop engages the second engagement surface. This establishes the position of the attachment point when the cover is secured by the latching mechanism. Importantly, this arrangement allows the position of the attachment point to be adjusted.

Specifically, turning the bolt in a first direction will move the position of the attachment point toward the back of the vehicle. Turning the bolt in the opposite direction moves the position of the attachment point toward the front of the vehicle. A calibrated guide is provided on each latch mechanism of the latch assembly. The calibrated guide in cooperation with the second engagement surface is used to assist in aligning the positions of the two attachment points provided by the two separate latch mechanisms of the latch assembly.

OBJECTS OF THE INVENTION

It is an object of the invention to keep the tonneau cover tightly on the truck bed of a pick up truck.

It is an object of the invention to permit adjustment in the event of cover shrinkage or expansion so that the cover can be secured tightly over the bed of the pick up truck.

It is an object of the invention to allow adjustable movement of the attachment points of the latch mechanism to accommodate tarps of different sizes to accommodate the stretching or shrinking of the tarp.

It is an object of the invention to provide an easy to use tonneau cover.

It is an object of the invention to provide an adjustable pressure latch system for the tonneau cover.

It is an object of the invention to provide an easy to open and close latch system for the tonneau cover.

Other objects, advantages and novel features of the present invention will become apparent from the following description of the preferred embodiments when considered in conjunction with the accompanying drawings.

DETAILED DESCRIPTION OF A PREFERRED EMBODIMENT

Figure 1:
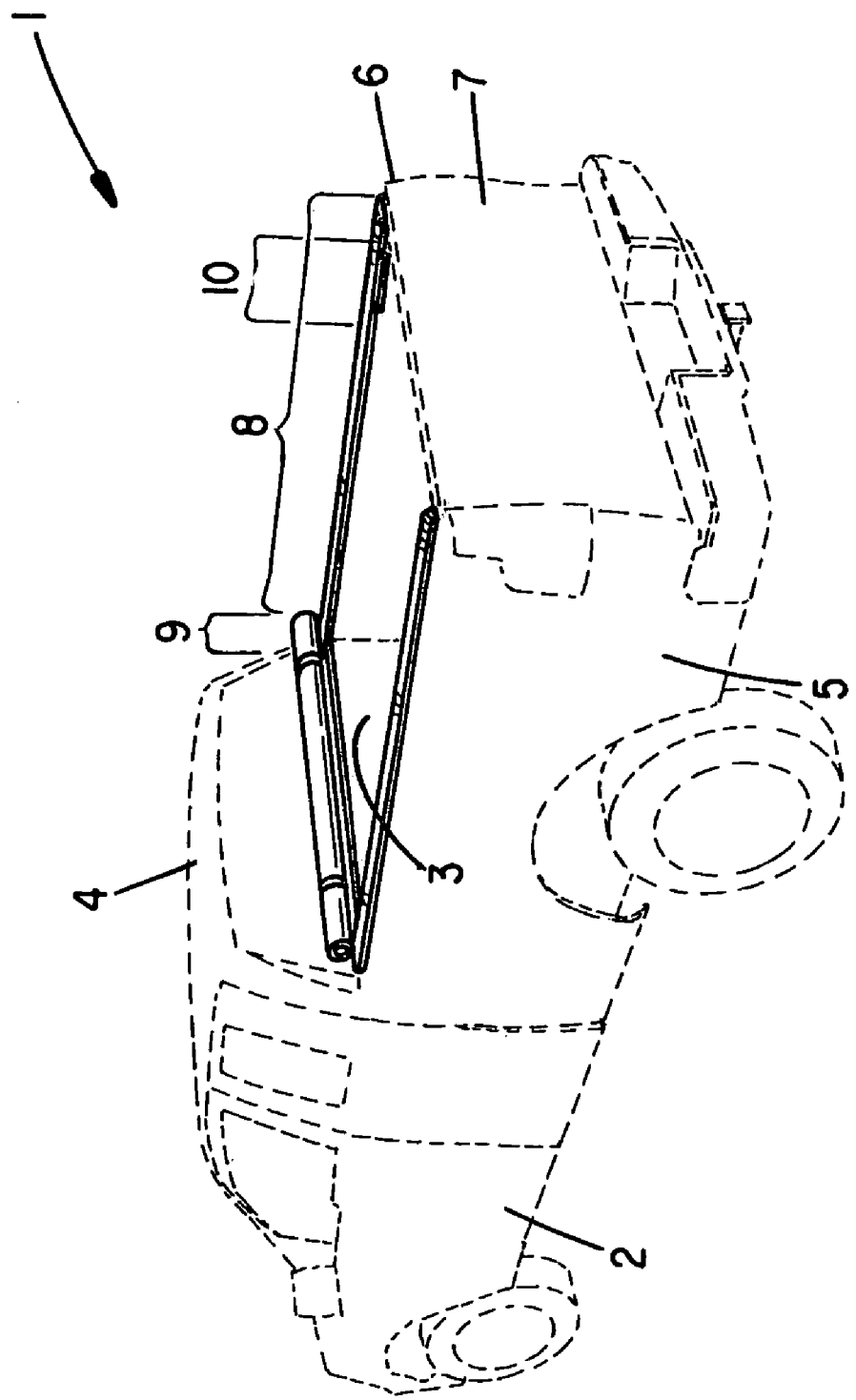
FIG. 1 is an elevated perspective view of the present invention where the tarp is in a rolled up configuration.
Figure 2:
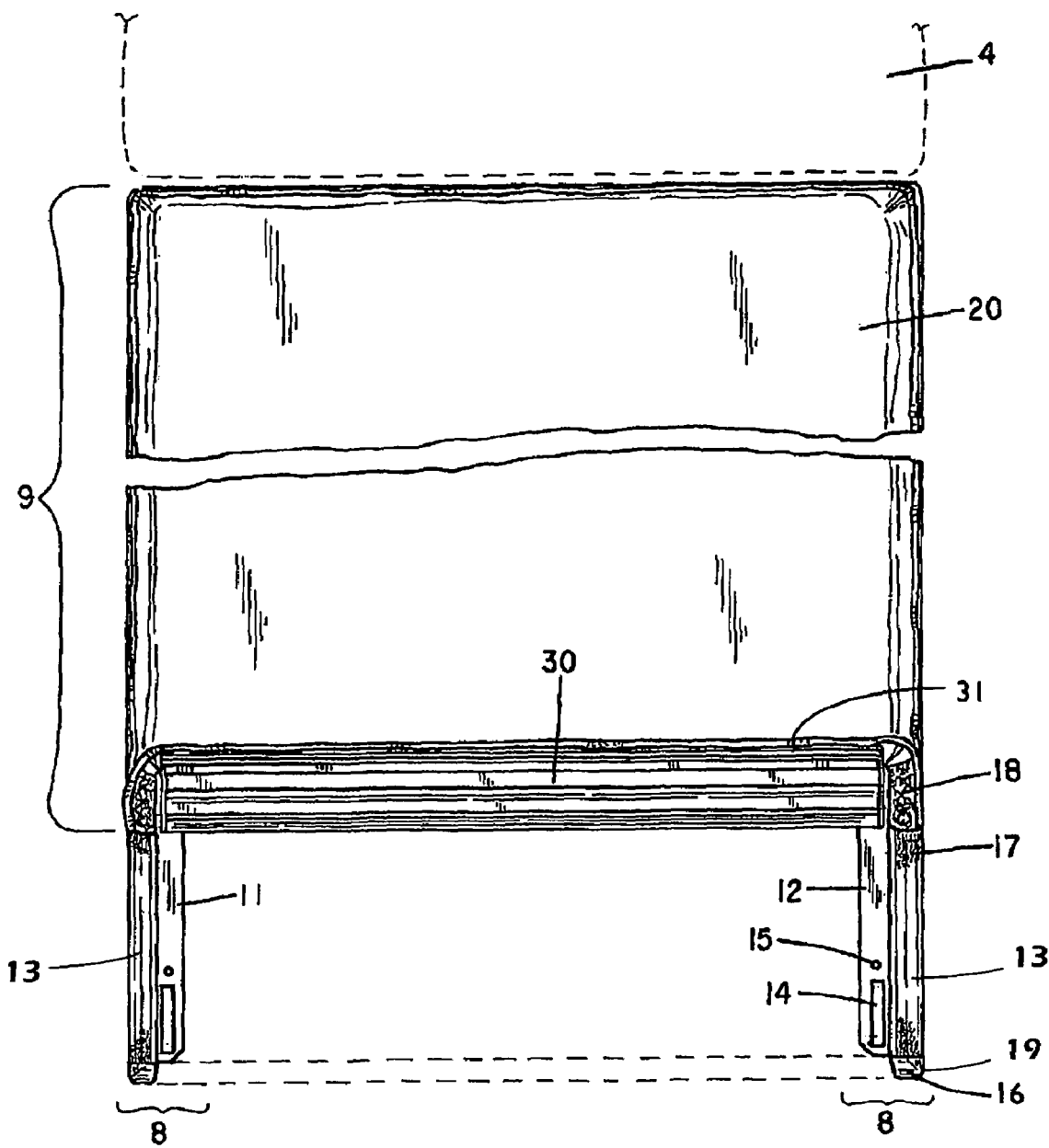
FIG. 2 is an top view of the present invention where the tarp is in a partially rolled back configuration and where the latch mechanisms have been removed.

The present invention represents broadly applicable improvements for truck bed covers and roll-up tonneau covers. The embodiments herein are intended to be taken as representative of those in which the invention may be incorporated and are not intended to be limiting.

The tonneau cover assembly 1 of the present invention is shown in the accompanying drawings as used to cover the box 3 of a pickup truck 2. The box 3 extends rearwardly from the cab 4 of the truck. The box 3 has a pair of side panels 5 and 6 as well as a tailgate 7 and open top.

The tonneau cover assembly 1 includes three subassemblies—a frame subassembly 8, a tarp subassembly 9 and a latch subassembly 10.

The frame subassembly includes a pair of rails 11 and 12 each of which is secured to the top of one of the side panels 5 or 6 of the pickup truck box 3. The rails can have a standard configuration. However, the rails 11 and 12 may have an outer radiused, rounded surface 13 along their lengths.

Preferably each rail includes an elongated longitudinal slot 14 extending through the rail near the back end of the rail as well as a hole 15 through the rail adjacent the slot 14.

Additionally, on both ends of each side rail are plastic corner caps 16. These corner caps 16 slope in a manner to form smooth surfaces rounding out the ends of the rails. The sloping corner caps 16 cooperate with a deployed tarp subassembly 9 to provide a specially tailored fit with respect to all four corners of the tonneau cover. The corner caps 16 are also functionally important to this design as they allow the installer to lay the side rails 11 and 12 in place while securing the rails to the truck box with clamps. The corner caps 16 contain integral, protective, sealing pads 19 which actually lay on top of the truck bed's bulkhead and tailgate to support and validate the tailored finish of the cover, and provide the proper install height for the side rails. This is advantageous over prior art designs as typically, rails do not lay in position and must be held at the proper height while securing clamps. Those designs causing installation to be difficult for one person to accomplish alone.

The tarp subassembly 9 includes a tarp 20 having four sides and sized to cover the entire open top of the truck box 3. The tarp subassembly 9 also includes an element for securing one side of the tarp 20 to the front of the frame adjacent the truck's cab 4. Mechanisms are also provided for releasably securing the sides of the tarp 20 to the rails 11 and 12 of frame assembly 8. In the drawings, this mechanism is a strip of a complementary hook and loop fastener sometimes offered under the trademark VELCRO®. As shown, the strip of hook material 17 is on the frame and the strip of loop material 18 is on the tarp 20. However, this may be reversed.

It is important to note that one strip of the hook and loop fastener, either the hook material 17 or the loop material 18, is secured to the radiused surface of the rails 11 and 12. This radiused configuration is important when the tarp is being rolled up. It promotes non-destructive shearing separation of the two hook and loop components. This is advantageous over roll up style covers, where flat engaging surfaces often present a major problem to the deployment of the cover and often cause the hook and loop fasteners to partially engage and interfere with stretching of the cover and latching of the rear bar. Other types of fasteners may be used as well such as snaps or an elongated extended bead secured to the cover which can be coupled to a slot in the rail. The fourth side of the tarp 20 is referred to herein as the free end.

The latch subassembly 10 includes a latch bar 30 attached to the free end of tarp 20. This latch bar 30 cooperates with extruded gate seal 31 found along edge of the free end of the tarp 20. Generally, this seal 31 is made up of a number of thin, flexible flaps which extend parallel to the latch bar 30 and provide a tight fit between the tonneau cover and the tailgate 7. The extruded gate seal 31 is desirable as it may be "popped" into place yet not come off of the latch bar without purposefully pulling it off. The extruded gate seal 31 has a flexible "bulb" type design that will accommodate a wide range of air gaps by having the ability to fully collapse and spring back to its full bulb shape. The latch subassembly 10 also includes a pair of latch mechanisms 32, one attached to each of the rails 11 and 12 of the frame subassembly 8 adjacent the location of the tailgate 7 of the box 3. The latch mechanisms 32 capture the opposite ends of the latch bar 30 to secure the free end of tarp 20 in place.

The latch mechanisms 32 each include a block 34. The block 34 includes a main portion 36 and an extension 38. The main portion 36 includes a channel 40 having a narrower slot 42 extending therefrom and open to the bottom of block 34. The main portion 36 of the block 34 also has a hollow center portion 44 open to the sides. The hollow center portion includes a channel 45 in communication with a rear opening 46 extending through the end 48 of the block 34. The block 34 is fixed to one of the rails 11, 12 of the frame assembly 8. This is achieved using a bolt 90. The head of the bolt 90 is inserted in channel 40 of the block with the threaded portion of the bolt 90 extending through and past the narrower slot 42. The bolt 90 also passes through hole 15 in the rail 11, 12 of the frame assembly 8. A nut 92 is then coupled to the bolt 90 to fix the block 34 of the rail 11, 12.

Each latch mechanism 32 also includes a housing 50. The housing 50 is preferably integrally formed. Housing 50 includes a hollow main portion 52 which is sized to receive the block 34 and permit the housing 50 to slide relative to the block 34. The housing also includes a cylindrical portion 54 extending from the main portion 52. The cylindrical portion 54 is generally hollow and includes a first engagement surface 56 that surrounds a passage between the main portion 52 and the cylindrical portion 54. The cylindrical portion also has a stop 57, viewing slot 55 and a calibrated guide 55' associated with the viewing slot.

The housing 50 also includes a block extension engaging surface 58 and latch bar camming surface 60 which terminates in a lip 62. Projecting from the main portion 52 of housing 50 past the camming surface 60 and the lip 62 is a pall attachment surface 64. The pall attachment surface 64 has a generally hook shape. On the outer surface of the hook shape are three small protrusions 65 on each side which together generally form a U shape.

Each latch mechanism 32 also includes a pall 70 pivotally secured to the pall attachment surface 64 of the housing 50. The pall 70 terminates in a hook 71 facing the latch bar camming surface 60 of the housing. A pair of retention members 72 and 74, a bolt 76, a threaded cap 79, a washer 73, a cap cover 75 and a coil spring 78 are provided to secure the pall 70 to the pall attachment surface 64 so the pall is biased by the spring 78 toward the camming surface 60 of the housing. Retention members 72 and 74 each have groves 77 which match to the protrusions 65 on the hook shaped portion of housing 50. These protrusions 65 and grooves 77 match together to provide proper alignment of the retention members and help secure them in place.

It is important to note that the camming surface 60, lip 62 and pall 70 are configured to cooperate to capture an end of the latch bar 30. Thus, they define an attachment point for the latch bar 30. As explained below, the position of this attachment point is longitudinally adjustable relative to the rail 11, 12.

The block 34 and housing 50 are assembled in the following manner. First, a nut 80 is inserted in the channel 45 of the block 34 so that the threaded hole of the nut can be aligned with the block's opening 46. Similarly, bolt 90 is inserted into channel 40 of block 34.

Second, the block 34 is placed into the hollow main portion 52 of the housing 50. More specifically, the housing 50 and block 34 are positioned so that the block's extension 38 can engage and slide over the block engaging surface 58 of the housing 50. In this configuration, the block's opening 46 is in face-to-face registration with the passage between the main portion 52 and cylindrical portion 54 of the housing 50.

Third, a bolt 82 is inserted through a washer 84 and a spring 86. This assembly is then inserted into the cylindrical portion 54 of the housing and is advanced until the threaded end of bolt 82 passes through the passage between the cylindrical portion 54 and main portion 52 of the housing 50 as well as the block's opening 46. The spring is thus constrained between the first engagement surface 56 and the washer 84 which serves as a second engagement surface. If the washer 84 is eliminated, the head of the bolt can act as a second engagement surface. The bolt 82 is then mated with nut 80 to secure the block 34 and housing 50 together.

Finally, the latch mechanism 32 is secured to the frame. The pall attachment surface is inserted into slot 14 and the threaded end of bolt 90 is passed through hole 15 of the frame rail 11, 12. An eyelet 94 of handle 96 is then slid over the threaded end of the bolt 90. Nut 92 is then coupled to the bolt 90 to fix the latch mechanism to the frame. As shown in the drawings, the opposite end of the handle 96 is fixed to the pall.

The longitudinal position of the attachment point for the latch bar 30 of the attachment point for the latch bar 30 can be adjusted by turning bolt 82. Tightening the bolt 82 (i.e., turning it so it advances further into the cylindrical portion of the housing) moves the attachment point toward the back of the truck. Turning the bolt 82 in the opposite direction moves the position of attachment point away from the back of the truck.

Both latching mechanisms 32 are constructed in the same way, one being attached to rail 11 and the other being attached to rail 12. To assist in adjusting the two latch mechanisms so the respective attachment points are properly aligned with one another, the calibrations and viewing slots on the cylindrical section of the housing are provided. The viewing slot 55 and calibrated guide 55' permits the user to determine the distance of the washer 84 from the stop 57 when the latch bar 30 is not secured in position. When this distance is the same for the two latch mechanisms 32, a suitable alignment of the position of two attachment points provided by the two latch mechanisms is achieved. Those skilled in the art will recognize that this adjustment is achieved by turning the bolt 82 to change the distance between the stop 57 and the second engagement surface.

Figure 3:
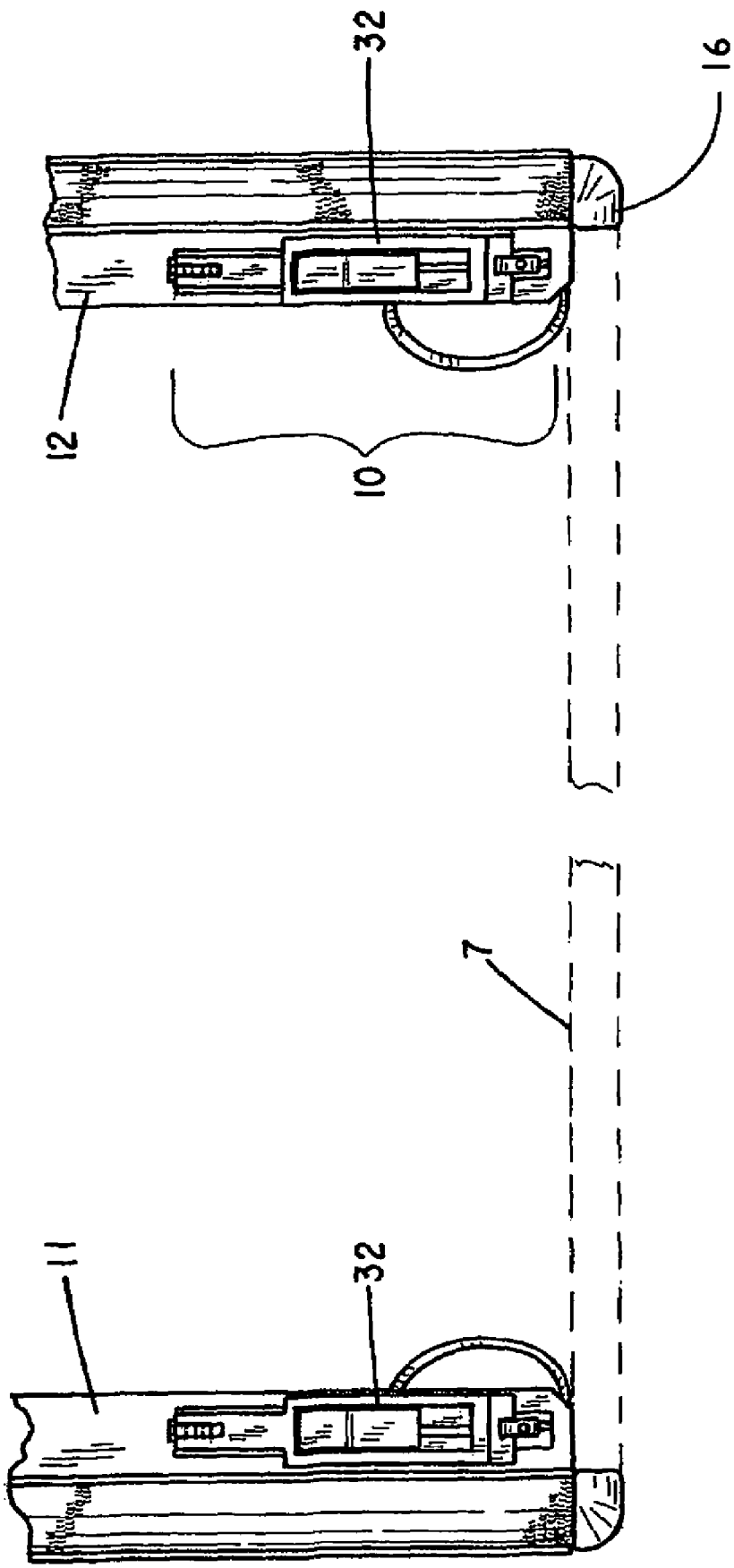
FIG. 3 is an top view of the present invention where the tarp is in a partially rolled back configuration.
Figure 4:
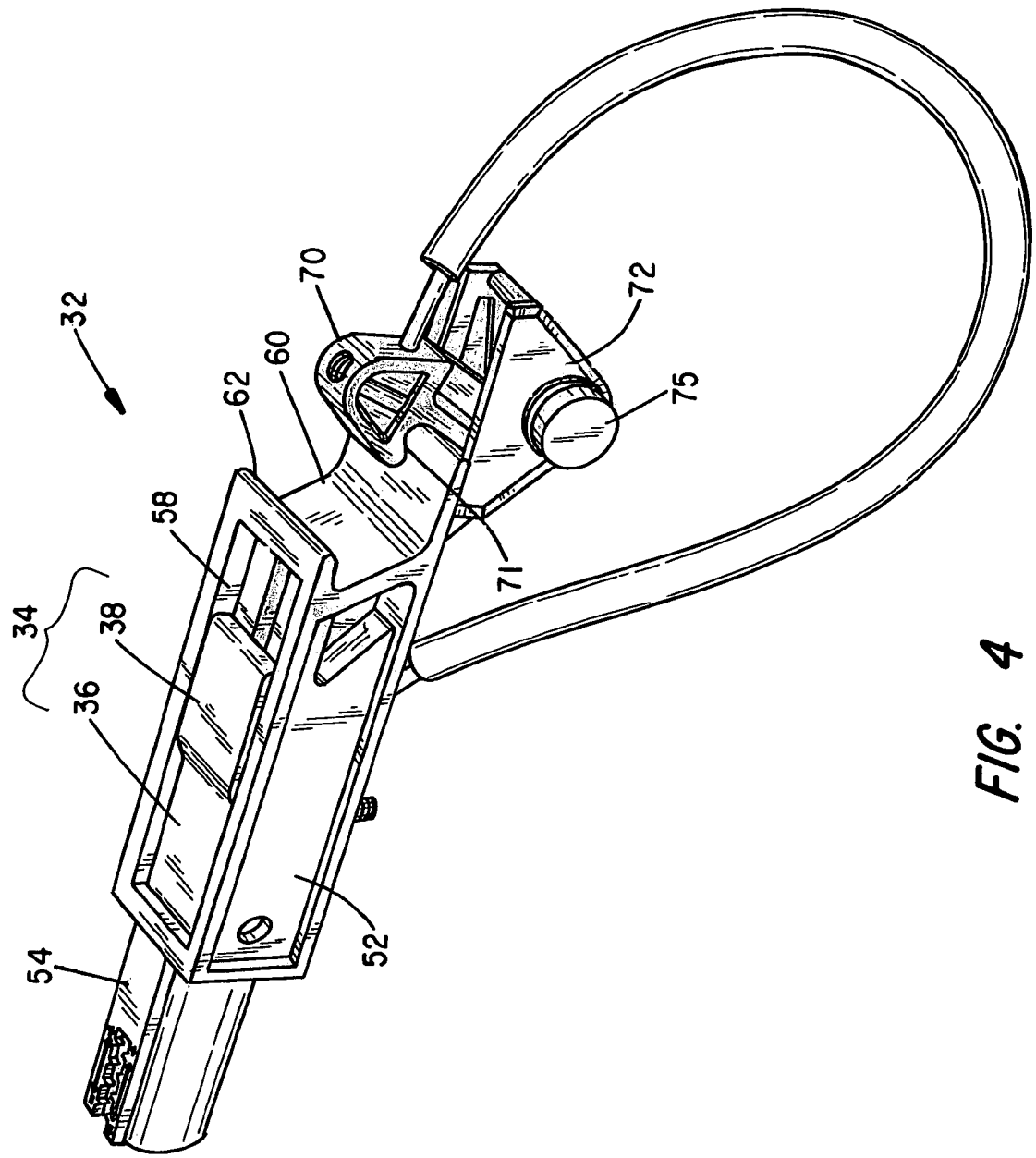
FIG. 4 is a side perspective view of one of the latch mechanisms.
Figure 5:
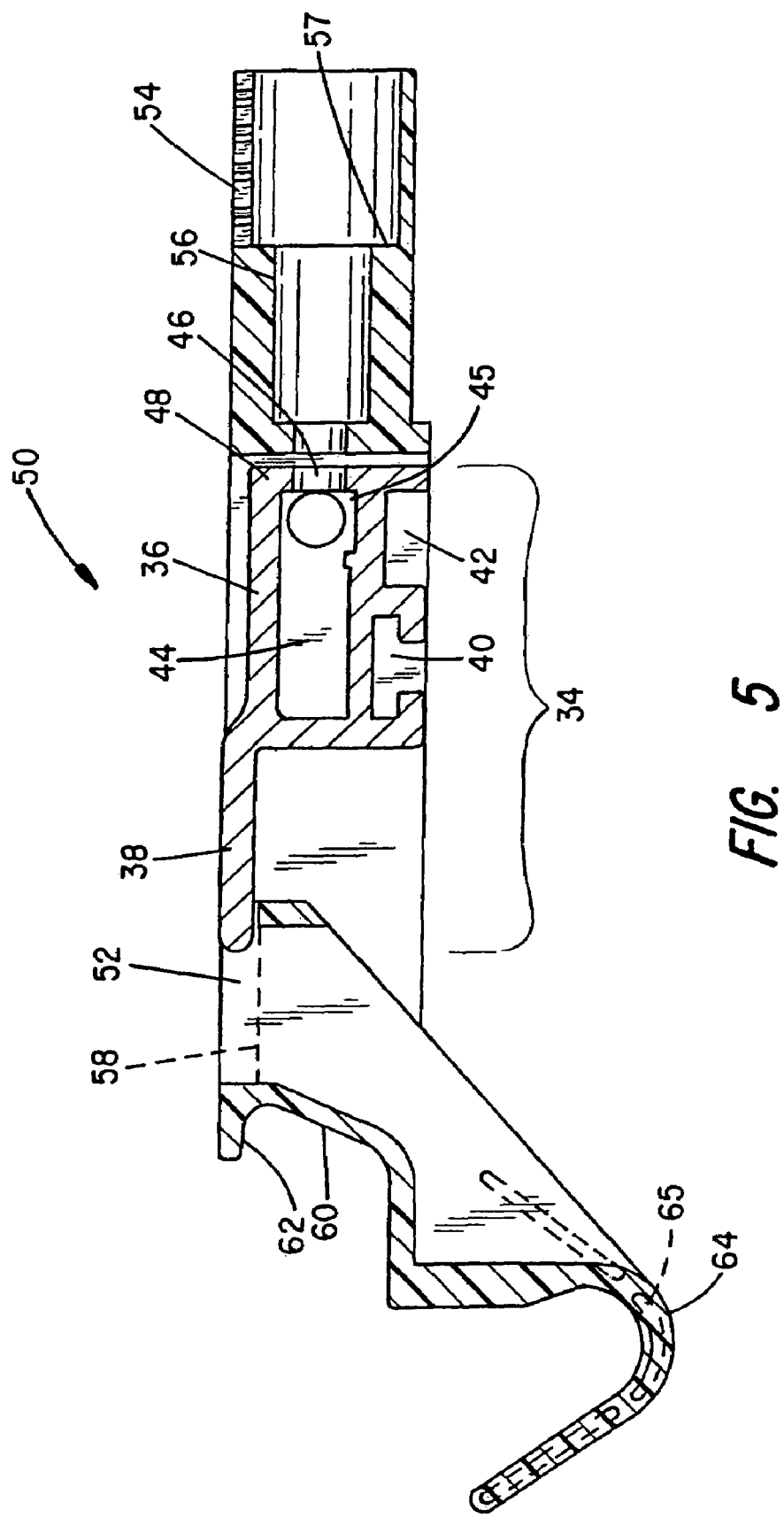
FIG. 5 is a side cross-sectional view of one of the latch mechanisms.
Figure 6:
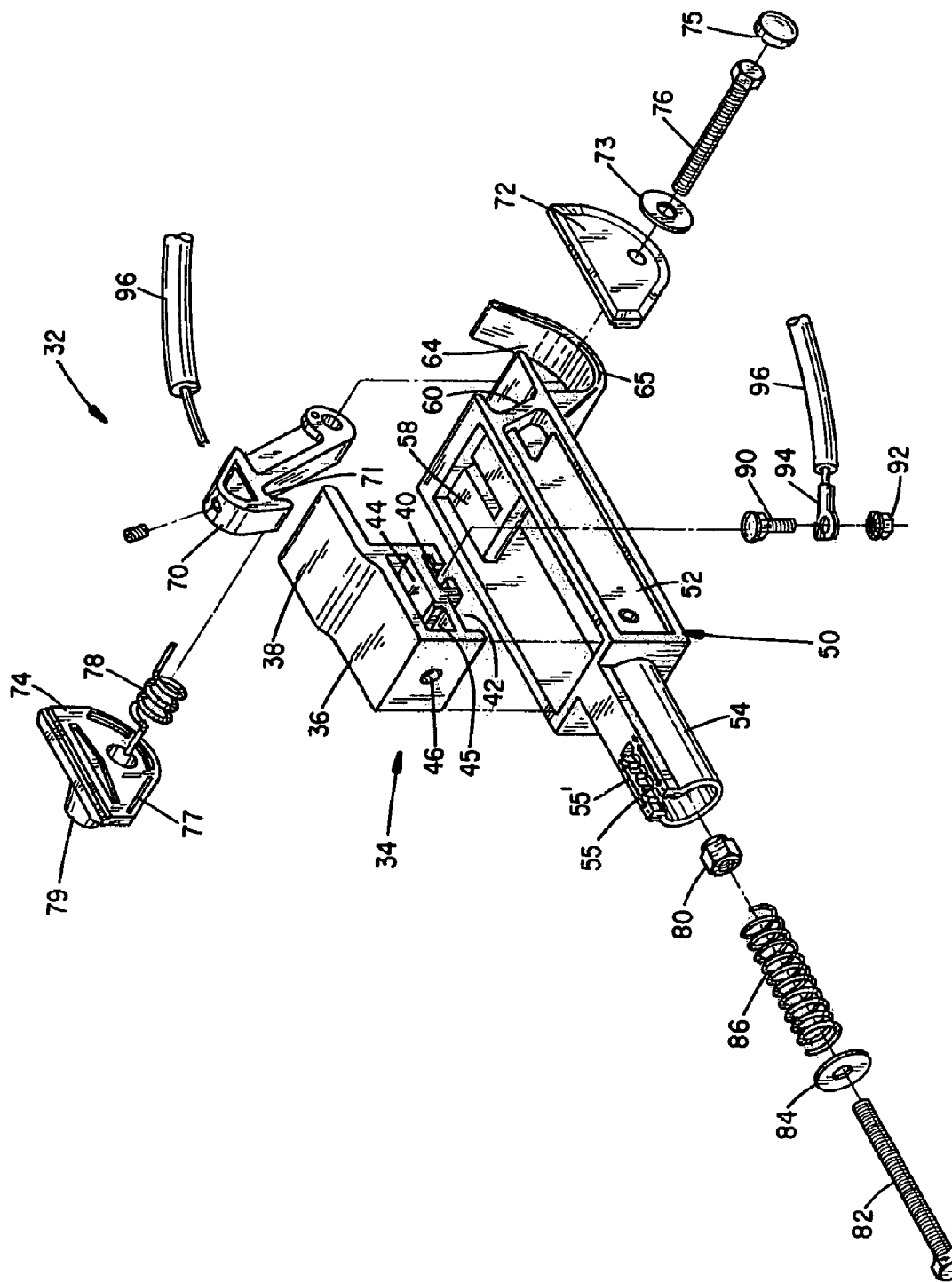
FIG. 6 is an exploded view of one of the latch mechanisms.

The operation of the tonneau cover 20 is as follows. First, the frame subassembly 8, tarp subassembly 9, and latch subassembly 10 are secured to the truck 2. The tarp 20 will generally be in the rolled up configuration near the cab 4 as seen in FIG. 1, so that the truck may be loaded or unloaded as desired. An operator then can unroll the cover back over the bed 3 of the truck. As the operator rolls back the cover he or she must be sure to match the hook material strip 18 of the cover 20 to match with the corresponding loop material strip 17 along the side rails 11 and 12. The tarp 20 is unrolled until the operator is holding the end of the tarp 20 and is ready to engage the latch bar 30, as seen in FIG. 3. The latch bar 30 is then slid against camming surface 60 of the housing 50. This action urges the housing member 50 away from the end of the truck 2 until the latch bar 30 is engaged by lip 62. While this is occurring the latch bar 30 is also being urged against pall 70. Pall member 70 is caused to rotate back until the hooked end 71 of pall 70 is engaged against the latch bar 30. When this occurs the latch bar 30 snaps into place and is secure at the attachment point for protection of the bed 3. Once the latch bar is in place, the user can then secure the side using the hook and loop fasteners (i.e., 17 and 18).

If when the tarp 20 is deployed it does not have sufficient tension, bolt 82 of each latch mechanism may be tightened to thereby prevent any slack in the tarp 20. Likewise, if there is too much tension bolt 82 of each latch mechanism can be loosened. Tightening and loosening the bolt adjusts the position of the attachment point. Such adjustment is typically performed with the latch bar 30 unattached to the latch mechanisms 32 and the cover partially rolled back. This permits easy access to the bolt 82 as well as a clear line of sight to the calibrated guide 55' and viewing slot 55.

When the operator later wishes to open the tarp 20, the operator must open the tailgate 7 of the truck 2 so that he or she has access to the flexible handles 96 on either side of the back of the truck 2. When these flexible handles 96 are pulled toward the user, the handles pull back the palls 70 from their biased position so that the pall's hooks 71 disengage from latch bar 30. The tarp 20 may then be rolled back upon itself and secured near the cab 4 of the truck.

This invention has been defined herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A tonneau cover for a truck box comprising:
   a. a frame having a first rail and a second rail, both rails terminating in padded plastic corners adapted to lay on top of the truck box, to provide a proper installation height for the rails while the rails are being secured to the truck box;
   b. a tarp having a free end;
   c. a latch bar attached to said free end;
   d. a first latch mechanism attached to said first rail and a second latch mechanism attached to said second rail, said first and second latch mechanisms each comprising (i) a block fixed to the rail; (ii) a housing slidably coupled to said block, said housing including structures that releasably secure the latch bar to said housing at an attachment point; and (iii) a mechanism for adjusting the longitudinal position of the attachment point relative to the rail comprising a bolt coupled to the block, an engagement surface associated with said block, and a stop on the housing which cooperates with said engagement surface to define the position of the attachment point and whereby the position of the attachment point can be adjusted by turning the bolt.

2. A tonneau cover for a truck box comprising:
a. a frame having a first rail and a second rail wherein both the first and second rails have a partially radiused surface covered by a material comprising the first half of a hook and loop fastener mechanism;
b. a tarp having a free end and strips of material comprising the second half of a hook and loop fastener for engaging the material on the first and second rails;
c. a latch bar attached to said free end;
d. a first latch mechanism attached to said first rail and a second latch mechanism attached to said second rail, said first and second latch mechanisms each comprising (i) a block fixed to the rail; (ii) a housing slidably coupled to said block, said housing including structures that releasably secure the latch bar to said housing at an attachment point; and (iii) a mechanism for adjusting the longitudinal position of the attachment point relative to the rail comprising a bolt coupled to the block, an engagement surface associated with said block, and a stop on the housing which cooperates with said engagement surface to define the position of the attachment point and whereby the position of the attachment point can be adjusted by turning the bolt.

3. A tonneau cover for a truck box comprising:
a. a frame having a first rail and a second rail;
b. a tarp having a free end;
c. a latch bar attached to said free end and cooperating with an extruded tail gate seal;
d. a first latch mechanism attached to said first rail and a second latch mechanism attached to said second rail, said first and second latch mechanisms each comprising (i) a block fixed to the rail; (ii) a housing slidably coupled to said block, said housing including structures that releasably secure the latch bar to said housing at an attachment point; and (iii) a mechanism for adjusting the longitudinal position of the attachment point relative to the rail comprising a bolt coupled to the block, an engagement surface associated with said block, and a stop on the housing which cooperates with said engagement surface to define the position of the attachment point and whereby the position of the attachment point can be adjusted by turning the bolt.

* * * * *